(12) United States Patent
Fang et al.

(10) Patent No.: US 6,976,905 B1
(45) Date of Patent: Dec. 20, 2005

(54) METHOD FOR POLISHING A MEMORY OR RIGID DISK WITH A PHOSPHATE ION-CONTAINING POLISHING SYSTEM

(75) Inventors: Mingming Fang, Naperville, IL (US); Shumin Wang, Naperville, IL (US); Homer Chou, Schaumburg, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 980 days.

(21) Appl. No.: 09/595,227

(22) Filed: Jun. 16, 2000

(51) Int. Cl.$^7$ .............................. B24B 1/00
(52) U.S. Cl. ..................... 451/41; 438/693; 451/36
(58) Field of Search .................. 451/60, 28, 41; 156/153, 644, 645, 636, 903; 51/298, 295, 51/306–309; 439/691–693

(56) References Cited

U.S. PATENT DOCUMENTS

| | | | | |
|---|---|---|---|---|
| 3,909,217 A | * | 9/1975 | Perry | 451/36 |
| 4,588,421 A | * | 5/1986 | Payne | 451/41 |
| 4,954,142 A | | 9/1990 | Carr et al. | |
| 4,959,113 A | * | 9/1990 | Roberts | 156/636 |
| 5,366,542 A | | 11/1994 | Yamada et al. | |
| 5,632,667 A | * | 5/1997 | Earl et al. | 451/41 |
| 5,637,028 A | * | 6/1997 | Haisma et al. | 451/28 |
| 5,690,539 A | * | 11/1997 | Swidler et al. | 451/39 |
| 5,738,695 A | * | 4/1998 | Harmer et al. | 451/28 |
| 5,770,095 A | | 6/1998 | Sasaki et al. | |
| 5,773,364 A | * | 6/1998 | Farkas et al. | 451/287 |
| 5,827,781 A | | 10/1998 | Skrovan et al. | |
| 5,866,031 A | | 2/1999 | Carpio et al. | |
| 5,868,604 A | | 2/1999 | Atsugi et al. | |
| 5,922,091 A | | 7/1999 | Tsai et al. | |
| 5,954,997 A | | 9/1999 | Kaufman et al. | |
| 6,015,506 A | | 1/2000 | Streinz et al. | |
| 6,069,080 A | * | 5/2000 | James et al. | 451/41 |
| 6,126,514 A | * | 10/2000 | Muroyama | 451/41 |
| 6,152,976 A | * | 11/2000 | Ishitobi et al. | 451/36 |
| 6,190,237 B1 | * | 2/2001 | Huynh et al. | 451/41 |
| 6,234,875 B1 | * | 5/2001 | Pendergrass, Jr. | 451/41 |
| 6,276,996 B1 | * | 8/2001 | Chopra | 451/60 |
| 6,280,490 B1 | * | 8/2001 | Rader et al. | 451/28 |

FOREIGN PATENT DOCUMENTS

| | | |
|---|---|---|
| WO | WO 99 24218 | 5/1999 |
| WO | WO 01 12740 | 2/2001 |

* cited by examiner

*Primary Examiner*—Hadi Shakeri
(74) *Attorney, Agent, or Firm*—Robert Lanning

(57) ABSTRACT

A method and system for planarizing or polishing a substrate, particularly a memory or rigid disk, are provided. The method comprises abrading at least a portion of the surface with a polishing system comprising (i) a polishing composition comprising water, an oxidizing agent, and about 0.04 M or higher phosphate ion or phosphonate ion, and (ii) abrasive material. The present invention also provides a system for planarizing or polishing a substrate comprising (i) a polishing composition comprising water, an oxidizing agent, and about 0.04 M or higher phosphate ion or phosphonate ion, and (ii) silica particles.

23 Claims, 1 Drawing Sheet

METHOD FOR POLISHING A MEMORY OR RIGID DISK WITH A PHOSPHATE ION-CONTAINING POLISHING SYSTEM

TECHNICAL FIELD OF THE INVENTION

This invention pertains to a polishing system and a method of planarizing or polishing a substrate, particularly a memory or rigid disk.

BACKGROUND OF THE INVENTION

The demand for increased storage capacity in memory or rigid disks and the trend towards miniaturization of memory or rigid disks (due to the requests of computer manufacturers for smaller hard drives) continues to emphasize the importance of the memory or rigid disk manufacturing process, including the planarization or polishing of such disks for ensuring maximal performance. While there exist several chemical-mechanical polishing (CMP) compositions and methods for use in conjunction with semiconductor device manufacture, few conventional CMP methods or commercially available CMP compositions are well-suited for the planarization or polishing of memory or rigid disks.

In particular, such polishing compositions and/or methods can result in less than desirable polishing rates and high surface defectivity when applied to memory or rigid disks. The performance of a rigid or memory disk is directly associated with its surface quality. Thus, it is crucial that the polishing compositions and methods maximize the polishing or removal rate yet minimize surface defectivity of the memory or rigid disk following planarization or polishing.

There have been many attempts to improve the removal rate of surface material from memory or rigid disks during polishing, while minimizing defectivity of the polished surface during planarization or polishing. For example, U.S. Pat. No. 4,769,046 discloses a method for polishing a nickel-plated layer on a rigid disk using a composition comprising aluminum oxide and a polishing accelerator such as nickel nitrate, aluminum nitrate, or mixtures thereof.

There remains a need, however, for improved compositions and methods of planarizing or polishing memory or rigid disks at a high removal rate, while minimizing surface defectivity. The present invention seeks to provide such a polishing system and method. These and other advantages of the present inventive polishing system and method will be apparent from the description of the invention provided herein.

BRIEF SUMMARY OF THE INVENTION

The present invention provides a method for planarizing or polishing the surface of a memory or rigid disk comprising abrading at least a portion of the surface with a polishing system comprising (i) a polishing composition comprising water, an oxidizing agent, and about 0.04 M or higher phosphate ion or phosphonate ion, and (ii) abrasive material. The present invention also provides a system for planarizing or polishing a substrate comprising (i) a polishing composition comprising water, an oxidizing agent, and about 0.04 M or higher phosphate ion or phosphonate ion, and (ii) silica particles.

DETAILED DESCRIPTION OF THE INVENTION

Figure 1:
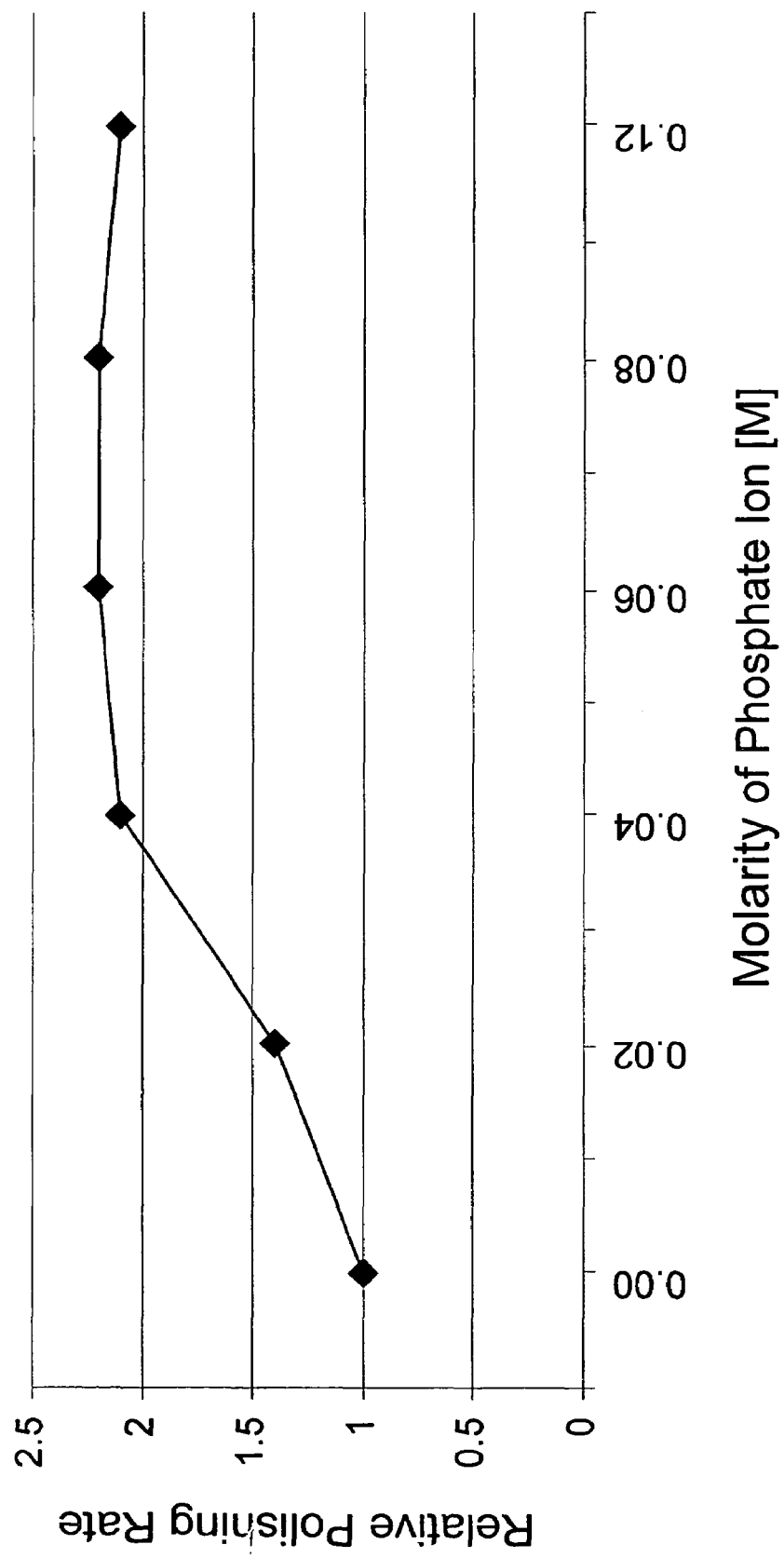
FIG. 1 is a graph of the molarity [M] of phosphate ion in the polishing composition of the polishing system of the present invention versus the relative removal rate of a memory or rigid disk achieved with the polishing system.

The present invention provides a method of planarizing or polishing the surface of a memory or rigid disk, as well as a polishing system useful in such a method. The method comprises contacting the surface of a memory or rigid disk with a polishing system comprising (i) a polishing composition comprising water, an oxidizing agent, and about 0.04 M or higher phosphate ion or phosphonate ion, and (ii) abrasive material, and abrading at least a portion of the surface of the memory or rigid disk by movement of the polishing system relative to the surface of the memory or rigid disk. Such contacting and abrading can take place by any suitable technique. For example, the polishing system can be applied to the surface of the memory or rigid disk and used to abrade at least a portion of the surface of the memory or rigid disk through use of a polishing pad.

The term "memory or rigid disk" refers to any magnetic disk, hard disk, rigid disk, or memory disk for retaining information in electromagnetic form. The memory or rigid disk typically has a surface that comprises nickel-phosphorus, but the memory or rigid disk surface can comprise any other suitable material.

The abrasive material of the polishing system can be any suitable abrasive material. The abrasive material desirably is in the form of particles and desirably is a metal oxide, e.g., metal oxide particles. Metal oxide abrasive materials include, for example, alumina, silica, titania, ceria, zirconia, germania, magnesia, and combinations thereof. Preferably, the abrasive material of the polishing system is a condensation-polymerized metal oxide, e.g., condensation-polymerized silica particles. Condensation-polymerized silica particles typically are prepared by condensing $Si(OH)_4$ to form colloidal particles. Such abrasive particles can be prepared in accordance with U.S. Pat. No. 5,230,833 or can be obtained as any of various commercially available products, such as the Akzo-Nobel Bindzil 50/80 product and the Nalco 1050, 2327, and 2329 products, as well as other similar products available from DuPont, Bayer, Applied Research, Nissan Chemical, and Clariant.

It should be understood that the polishing or planarization of a memory or rigid disk can involve two or more distinct polishing steps, utilizing different polishing systems, or alternatively utilizing substantially similar, or even the same, polishing systems. It is suitable, for example, to utilize in a first polishing step a "coarse" polishing system comprising abrasive particles with a particle size greater than 100 nm, and to utilize in a second polishing step a "fine" polishing system comprising abrasive particles with a particle size less than 100 nm. The abrasive particles of the polishing system of the present invention desirably are such that about 90% or more of the abrasive particles (by number) have a particle size no greater than 100 nm. Preferably, the abrasive particles are such that at least about 95%, 98%, or even substantially all (or actually all) of the abrasive particles (by number) have a particle size no greater than 100 nm. These particle size preferences for the abrasive particles (i.e., whereby at least about 90%, 95%, 98%, substantially all, and all of the abrasive particles (by number) are no greater than a specific size of abrasive particle) also can pertain to other particle sizes, such as 95 nm, 90 nm, 85 nm, 80 nm, 75 nm, 70 nm, and 65 nm.

Similarly, the abrasive particles can be such that at least about 90%, 95%, 98%, or even substantially all (or actually all) of the abrasive particles (by number) have a particle size no less than 5 nm. These particle size preferences for the abrasive particles (i.e., whereby at least about 90%, 95%, 98%, substantially all, and all of the abrasive particles (by number) are no less than a specific size of abrasive particle) also can pertain to other particle sizes, such as 7 nm, 10 nm, 15 nm, 25 mm, and 30 nm.

The percentage values used herein to describe the nature of the abrasive particles in terms of particle size are percentages "by number," rather than being weight percentages, unless otherwise noted. The particle size of the abrasive particles refers to the particle diameter. The particle size can be measured by any suitable technique. The particle size values set forth herein are based on a visual inspection, specifically by way of transmission electron micrography (TEM), of a statistically significant sample of the abrasive particles, preferably at least 200 particles.

The particle size distribution of the abrasive particles can be characterized by geometric standard deviation by number, referred to as sigma-g ($\sigma_g$). The $\sigma_g$ values can be obtained by dividing (a) the diameter at which 84% of the abrasive particles (by number) are less than by (b) the diameter at which 16% of the abrasive particles (by number) are less than (i.e., $\sigma_g = d_{84}/d_{16}$). Monodispersed abrasive particles have a $\sigma_g$ value of about 1. As the abrasive particles become polydispersed (i.e., include particles of increasingly different size), the $\sigma_g$ value of the abrasives particles increases above 1. The abrasive particles typically have a $\sigma_g$ value of about 2.5 or less (e.g., about 2.3 or less). The abrasive particles desirably have a $\sigma_g$ value of at least about 1.1 (e.g., about 1.1–2.3 (e.g., 1.1–1.3), preferably a $\sigma_g$ value of at least about 1.3 (e.g., about 1.5–2.3 or even about 1.8–2.3).

The abrasive material of the polishing system can exist in any suitable form. It is suitable, for example, for the abrasive material to be incorporated into the polishing composition, e.g., the aqueous medium of the polishing system. It is also suitable for the abrasive material of the polishing system to be fixed (e.g., embedded), in whole or in part, in or on a polishing pad or other surface placed in contact with the polishing composition and surface of the memory or rigid disk.

Any suitable amount of the abrasive material can be present in the polishing system, generally in the form of abrasive particles in the polishing composition. Preferably, the abrasive particles are present in a concentration of about 0.1 wt. % or more, e.g., 0.1–30 wt. % of the polishing composition, or even about 1–28 wt. % of the polishing composition. More preferably, the abrasive particles are present in a concentration of about 2–25 wt. % of the polishing composition, e.g., about 4–20 wt. % of the polishing composition, or even about 6–15 wt. % of the polishing composition.

The oxidizing agent of the polishing system can be any suitable oxidizing agent. Suitable oxidizing agents include, for example, per-compounds, which comprise one or more peroxy groups (—O—O—). Suitable per-compounds include, for example, peroxides, persulfates (e.g., monopersulfates and dipersulfates), percarbonates, and acids thereof, and salts thereof, and mixtures thereof. Other suitable oxidizing agents include, for example, bromates, perbromates, perborates, chlorates, perchlorates, chromates, dichromates, periodates, iodates, nitrates, permanganates, sulfates, citrates, cerium (IV) compounds (e.g., ammonium cerium nitrate), oxidizing metal salts (e.g., sodium salts, iron salts, potassium salts, aluminum salts, and the like), oxidizing metal complexes, nonmetallic oxidizing acids, ammonium salts, phosphonium salts, ferricyanides (e.g., potassium ferricanide), trioxides (e.g., vanadium trioxide), and acids thereof, and salts thereof, and mixtures thereof. Most preferred oxidizing agents include, for example, hydrogen peroxide, urea-hydrogen peroxide, sodium peroxide, benzyl peroxide, di-t-butyl peroxide, peracetic acid, ammonium persulfate, potassium iodate, and salts thereof, and mixtures thereof.

Any suitable amount of the oxidizing agent can be present in the polishing system, particularly the polishing composition. The oxidizing agent desirably is present in an amount of about 0.01 wt. % or more, e.g., about 0.05 wt. % or more. Preferably, the oxidizing agent is present in an amount of about 0.1 wt. % or more, e.g., about 0.2 wt. % or more, about 0.3 wt. % or more, about 0.4 wt. % or more, about 0.5 wt. % or more, about 0.6 wt. % or more, or even about 0.7 wt. % or more. The oxidizing agent also can be present in an amount of about 1 wt. % or more, e.g., about 1.2 wt. % or more, about 1.5 wt. % or more, about 1.7 wt. % or more, or even about 2 wt. % or more (e.g., about 2.2 wt. % or more, or about 2.5 wt. % or more). Generally, the oxidizing agent is present in the polishing composition in an amount that does not exceed about 15 wt. %, preferably an amount that does not exceed about 10 wt. % (e.g., about 0.1–10 wt. %, preferably, about 0.1–5 wt. %, or more preferably, about 0.3–0.6 wt. %).

The phosphate ion is defined by the chemical structure $PO_4$, wherein the structure comprises a double bond (P=O). The phosphate ion can be derived from any suitable source of phosphate ion. Suitable sources of phosphate ion include, for example, water-soluble phosphates, e.g., orthophosphates, polyphosphates, and mixtures thereof. The source of phosphate ion also can be selected from the group consisting of pyrophosphates, tripolyphosphates, and mixtures thereof. Preferably, the source of phosphate ion is selected from the group consisting of a sodium phosphate, a potassium phosphate, a lithium phosphate, a cesium phosphate, a magnesium phosphate, an ammonium phosphate, and the like, and mixtures thereof.

The phosphonate ion is defined by the chemical structures $RO$—$PO_3$ or $R_2O_2$—$PO_2$, wherein the structures comprise a double bond (P=O), and wherein R is an organic moiety, typically, an organic moiety selected from the group consisting of an alkyl moiety, an aryl moiety, a cyclic moiety, an aromatic moiety, and a heteroatom-containing organic moiety (e.g., an N-containing organic moiety). The phosphonate ion can be derived from any suitable source of phosphonate ion. Suitable sources of phosphonate ion include, for example, amine-containing phosphonates, imine-containing phosphonates, imide-containing phosphonates, amide-containing phosphonates, phosphonate compounds containing no nitrogen (e.g., phosphonates containing no amine groups), and mixtures thereof. Preferably, the source of phosphonate ion is selected from the group consisting of phosphoacetic acid, 2-aminoethyl dihydrogen phosphate, aminotri(methylenephosphonic acid), nitrilotris(methylene) triphosphonic acid, 1-hydroxyethylidene-1-diphosphonicacid, and diethylenetriaminepenta(methylenephosphonic acid), and mixtures thereof.

Any suitable amount of the phosphate ion or phosphonate ion can be present in the polishing system, and particularly in the polishing composition. It is suitable, for example, for the phosphate ion or phosphonate ion to be present in a concentration of about 0.02 M or higher, e.g., about 0.03 M or higher. Most preferably, the phosphate ion or phosphonate ion is present in a concentration of about 0.04 M or higher, e.g., about 0.05 M or higher, about 0.06 M or higher, about 0.07 M or higher, or even about 0.08 M or higher (e.g., about 0.1 M or higher, or even about 0.12 M or higher). It is also suitable for the phosphate ion or phosphonate ion to be present in a concentration of about 0.15 M or higher, e.g., about 0.2 M or higher, about 0.3 M or higher, or even about 0.4 M or higher. Generally, the phosphate ion or phosphonate ion is present in the polishing composition in a concentration that does not exceed about 1 M, preferably a concentration that does not exceed about 0.75 M, e.g., about 0.5 M or less.

The pH of the polishing system can be any suitable pH. Preferably, the pH of the polishing system is about 1–12, e.g., about 1–10, or even about 1–7. More preferably, the pH of the polishing system is about 1–5, e.g., about 2–5, or even about 3–4.

The pH of the polishing system can be adjusted, if necessary, in any suitable manner, e.g., by adding a pH adjuster to the polishing system. Suitable pH adjusters include, for example, bases such as potassium hydroxide, ammonium hydroxide, sodium carbonate, and mixtures thereof, as well as acids such as mineral acids (e.g., nitric acid and sulfuric acid) and organic acids (e.g., acetic acid, citric acid, malonic acid, succinic acid, tartaric acid, and oxalic acid).

The polishing system, particularly the polishing composition, optionally can further comprise one or more other additives. Such additives include surfactants (e.g., cationic surfactants, anionic surfactants, nonionic surfactants, amphoteric surfactants, fluorinated surfactants, and mixtures thereof), polymeric stabilizers or other surface active dispersing agents (e.g., organic acids, tin oxides, and phosphonate compounds), and additional polishing accelerators such as catalysts and chelating or complexing agents (e.g., metal, particularly ferric, sulfates, compounds with carboxylate, hydroxyl, sulfonic, and/or phosphonic groups, di-, tri-multi-, and poly-carboxylic acids and salts (such as tartaric acids and tartrates, malic acid and malates, malonic acid and malonates, gluconic acid and gluconates, citric acid and citrates, phthalic acid and phthalates, pyrocatecol, pyrogallol, gallic acid and gallates, tannic acid and tannates), amine-containing compounds (such as primary, secondary, tertiary, and quaternary amines and phosphate-containing compounds), and mixtures thereof).

The surface of the memory or rigid disk can be planarized or polished with the polishing system of the present invention by any suitable technique. In this regard, it is suitable for the polishing system to be formulated prior to delivery to the polishing pad or to the surface of the substrate. It is also suitable for the polishing system to be formulated (e.g., mixed) on the surface of the polishing pad or on the surface of the substrate, through delivery of the components of the polishing system from two or more distinct sources, whereby the components of the polishing system meet at the surface of the polishing pad or at the surface of the substrate. In this regard, the flow rate at which the components of the polishing system are delivered to the polishing pad or to the surface of the substrate (i.e., the delivered amount of the particular components of the polishing system) can be altered prior to the polishing process and/or during the polishing process. Moreover, it is suitable for the particular components of the polishing system being delivered from two or more distinct sources to have different pH values, or alternatively to have substantially similar, or even equal, pH values, prior to delivery to the surface of the polishing pad or to the surface of the substrate. It is also suitable for the particular components being delivered from two or more distinct sources to be filtered either independently or to be filtered jointly (e.g., together) prior to delivery to the surface of the polishing pad or to the surface of the substrate.

The surface of the memory or rigid disk can be planarized or polished with the polishing system with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, and coformed products thereof, and mixtures thereof. As discussed above, the abrasive of the polishing system can be fixed (e.g., embedded) in whole or in part, in or on the polishing pad such fixation on the polishing pad can be accomplished, for example, by blending the abrasive material, e.g., abrasive particles, into the aforementioned polymers during the formation of the polishing pad.

The viscosity of the polishing system can be adjusted by altering the concentrations of the particular components of the polishing system. The viscosity of the polishing system also can be adjusted through the addition to the polishing system of any suitable rheological control agent (i.e., a polymeric rheological control agent). Suitable rheological control agents include, for example, urethane polymers (e.g., urethane polymers with a molecular weight greater than about 100,000 Daltons), and acrylates comprising one or more acrylic subunits (e.g., vinyl acrylates and styrene acrylates), and polymers, copolymers, and oligomers thereof, and salts thereof.

EXAMPLES

The following examples further illustrate the present invention but, of course, should not be construed as in any way limiting its scope.

The memory or rigid disks referenced in all of the following examples are commercially available memory or rigid disks obtained from Seagate Technology. The memory or rigid disks were nickel-phosphorous coated (plated) disks with aluminum substrates. The memory or rigid disks had undergone a pre-polishing process prior to being used in the following examples, and each memory or rigid disk had a surface roughness of 10–50 Å.

The polishing pads used in all examples were 25.4 cm diameter Politex Hi pads manufactured by Rodel. The memory or rigid disks in Examples 1, 2, and 4 were polished using a table top polishing machine manufactured by Strauer (West Lake, Ohio) with a platen speed of 150 rpm, a polishing carrier speed of 150 rpm, a slurry flow rate of 100 ml/min, and a polishing downforce of 50 N. The memory or rigid disks in Example 3 were polished using a Strausbaugh 6EE polishing machine (San Luis Obispo, Calif.) with a polishing pad speed of 55–65 rpm and a polishing downforce of 10–12.5 N.

Nickel-phosphor polishing rates were calculated by weighing the clean, dry memory or rigid disk prior to polishing and following polishing. The weight loss was converted to a memory or rigid disk thickness loss using a nickel-phosphor density of 8.05 g/cm$^3$. To allow for more precise comparisons between polishing compositions within each of the following examples despite differences in nominally identical polishing conditions (particularly with respect to polishing pad wear during the course of testing), a control composition with 4 wt. % silica (specifically, Akzo-Nobel Bindzil 50/80 product) and 0.25 wt. % hydroxylamine nitrate (HAN), wherein the control composition had a pH of 3.5, was utilized at regular intervals. The actual polishing rate of each test composition was then converted to a relative polishing rate by dividing the polishing rate of the test composition by the polishing rate of the most recently evaluated control composition. Accordingly, the relative polishing rates of the test compositions are comparable across all examples.

Substrate roughness was determined in Example 5 using a Veeco Texture Measurement System 2000 (TMS-2000) profilometer (Veeco, Santa Barabara, Calif.), which utilizes a collimated beam of light, coupled to an optical microscope system, to measure substrate thickness differential across the test surface.

Example 1

This example illustrates that the polishing rate of a memory or rigid disk achievable by the present inventive method is dependent on the identity of the source of phosphate ion or phosphonate ion in the polishing composition.

Nickel-phosphor plated memory or rigid disks were polished separately with six different polishing compositions with 4 wt. % silica (specifically, Akzo-Nobel Bindzil 50/80 product), 2 wt. % $H_2O_2$, and 1 wt. % of either a source of phosphate ion (specifically, ammonium phosphate (($NH_4$)$H_2PO_4$)) or a source of phosphonate ion (specifically, phosphonoacetic acid, 1-hydroxyethylidene-1-diphosphonicacid (i.e., Dequest 2010 product), 2-aminoethyl dihydrogen phosphate, nitrilotris(methylene)triphosphonicacid (i.e., Dequest 2006 product), or diethylenetriaminepenta(methylenephosphonicacid) (i.e., Dequest 2066 product)), such that the polishing compositions had 0.07–0.13 M phosphate ion or phosphonate ion (specifically, 0.073 M, 0.075 M, 0.065 M, 0.07 M, 0.09 M, 0.1 M, and 0.13 M, respectively), and wherein each of the polishing compositions had a pH of 2.5. For comparison purposes, nickel-phosphor plated memory or rigid disks also were polished with a control polishing composition as described above and with four comparative polishing compositions with 4 wt. % silica (specifically, Akzo-Nobel Bindzil 50/80 product), alone (Comparative Composition 1) and with either 2 wt. % $H_2O_2$, 0.75 wt. % of a source of phosphate ion (specifically, ($NH_4$)$H_2PO_4$), or 1.5 wt. % ($H_4$)$H_2PO_4$ (Comparative Compositions 2–4, respectively), wherein all comparative compositions had a pH of 2.5. Following use of the polishing compositions, the relative polishing rate of each composition was determined, with the resulting data set forth in Table 1.

As is apparent from the data set forth in Table 2, the relative polishing rates exhibited by polishing compositions containing both $H_2O_2$ and source of phosphate ion (Compositions 2A–2H) were greater than the relative polishing rates of the control polishing composition and the comparative compositions that did not contain both $H_2O_2$ and a source of phosphate ion or phosphonate ion (Comparative Compositions 1–4). Moreover, the relative polishing rates achieved by polishing compositions with a pH of 2.5 (Compositions 2A, 2C, 2E, and 2G) were higher than the relative polishing rates achieved by polishing compositions with a pH of 3.0 and 3.5, but which were otherwise identical (Compositions 2B, 2D, 2F, and 2H, respectively). In addition, the relative polishing rates exhibited by the polishing compositions with a pH of 2.5, 1.5 wt. % $H_2O_2$, and 1 wt. % of either ($NH_4$)$H_2PO_4$, $KH_2PO_4$, or $Na_5P_3O_{10}$ (Compositions 2A, 2C, and 2G, respectively) were greater than the relative polishing rate exhibited by the polishing composition with a pH of 2.5, 1.5 wt. % $H_2O_2$, and 1 wt. % $K_4P_2O_7$ (Composition 2E).

These results demonstrate the significance of the particular source of phosphate ion or phosphonate ion, as well as the pH of the polishing composition, on the polishing rate achievable by the present inventive method.

Example 3

This example illustrates the significance of the concentration (molarity) of the phosphate ion or phosphonate ion in the polishing composition on the polishing rate of a memory or rigid disk achievable by the present inventive method.

Nickel-phosphor plated memory or rigid disks were polished separately with five different polishing compositions with 4 wt. % silica (specifically, Akzo-Nobel Bindzil 50/80 product), 1.5 wt. % $H_2O_2$, and 0.25–1.5 wt. % of a source of phosphate ion (specifically, sodium tripolyphosphate (STP)), such that the polishing compositions had 0.02–0.12 M phosphate ion (specifically, 0.02 M, 0.04 M, 0.06 M, 0.08 M, and 0.12 M, respectively), and wherein each of the polishing compositions had a pH of 2.2. Following use of the polishing compositions, the polishing rate of each composition was determined with the resulting data set forth in Table 3. For comparison purposes, Table 3 also sets forth the relative polishing rate for the control polishing composition as described above.

TABLE 1

| Composition | Source of Phosphate Ion or Phosphonate Ion | Molarity of Phosphate or Phosphonate Ion [M] | Wt. % $H_2O_2$ | Relative Polishing Rate |
| --- | --- | --- | --- | --- |
| Control | none | none | (HAN) | 1.0 |
| Comparative 1 | none | none | none | 0.8 |
| Comparative 2 | none | none | 2 | 1.4 |
| Comparative 3 | 0.75 wt. % ($NH_4$)$H_2PO_4$ | 0.065 | none | 0.65 |
| Comparative 4 | 1.5 wt. % ($NH_4$)$H_2PO_4$ | 0.13 | none | 0.65 |
| 1A | 1 wt. % ($NH_4$)$H_2PO_4$ | 0.09 | 2 | 2.1 |
| 1B | 1 wt. % phosphonoacetic acid | 0.07 | 2 | 2.3 |
| 1C | 1 wt. % Dequest 2010 | 0.1 | 2 | 2.1 |
| 1D | 1 wt. % 2-aminoethyl dihydrogen phosphate | 0.07 | 2 | 1.7 |
| 1E | 1 wt. % Dequest 2006 | 0.075 | 2 | 2.0 |
| 1F | 1 wt. % Dequest 2066 | 0.073 | 2 | 2.0 |

As is apparent from the data set forth in Table 1, the relative polishing rates exhibited by polishing compositions containing $H_2O_2$ and a source of phosphate ion or phosphonate ion (Compositions 1A–1F) were greater than the relative polishing rates of the control polishing composition and the comparative compositions that did not contain both $H_2O_2$ and a source of phosphate ion or phosphonate ion (Comparative Compositions 1–4). Moreover, the relative polishing rate exhibited by the polishing composition with $H_2O_2$ and 1 wt. % phosphoacetic acid (Composition 1B) was greater than the relative polishing rates for the polishing compositions with $H_2O_2$ and 1 wt. % of either $(NH_4)H_2PO_4$, Dequest 2010, 2-aminoethyl dihydrogen phosphate, Dequest 2006, or Dequest 2066 (Compositions 1A and 1C–1F).

These results demonstrate the significance of the combination of an oxidizing agent and a source of phosphate ion or phosphonate ion in the context of the present inventive method, as well as the effect of the particular source of phosphate ion or phosphonate ion on the polishing rate achievable by the present inventive method.

Example 2

This example further illustrates that the polishing rate of memory or rigid disks achievable by the present inventive method is dependent on the identity of the source of phosphate ion in the polishing composition, as well as the pH of the polishing system.

Nickel-phosphor plated memory or rigid disks were polished separately with eight different polishing compositions with 4 wt. % silica (specifically, Akzo-Nobel Bindzil 50/80 product), 1.5 wt. % $H_2O_2$, and 1 wt. % of a source of phosphate ion (specifically, ammonium phosphate $((NH_4)H_2PO_4)$, potassium phosphate $(KH_2PO_4)$, potassium pyrophosphate $(K_4P_2O_7)$, or sodium tripolyphosphate $(Na_5P_3O_{10})$), such that the polishing compositions had 0.06–0.09 M phosphate ion (specifically, 0.06 M, 0.07 M, 0.08 M, and 0.09 M, respectively), and wherein the polishing compositions had a pH of 2.5–3.5 (specifically, 2.5, 3.0, or 3.5). Following use of the polishing compositions, the polishing rate of each composition was determined, with the resulting data set forth in Table 2. For comparison purposes, Table 2 also sets forth the relative polishing rates for the control polishing composition as described above and for the four "comparative" polishing compositions described in Example 1 (Comparative Compositions 1–4).

TABLE 2

| Composition | pH | Source of Phosphate Ion | Molarity of Phosphate Ion [M] | Wt. % $H_2O_2$ | Relative Polishing Rate |
|---|---|---|---|---|---|
| Control | 3.5 | none | none | (HAN) | 1.0 |
| Comparative 1 | 2.5 | none | none | none | 0.8 |
| Comparative 2 | 2.5 | none | none | 2 | 1.4 |
| Comparative 3 | 2.5 | 0.75 wt. % $(NH_4)H_2PO_4$ | 0.065 | none | 0.65 |
| Comparative 4 | 2.5 | 1.5 wt. % $(NH_4)H_2PO_4$ | 0.13 | none | 0.65 |
| 2A | 2.5 | 1 wt. % $(NH_4)H_2PO_4$ | 0.09 | 1.5 | 2.6 |
| 2B | 3.5 | 1 wt. % $(NH_4)H_2PO_4$ | 0.09 | 1.5 | 1.9 |
| 2C | 2.5 | 1 wt. % $KH_2PO_4$ | 0.07 | 1.5 | 2.4 |
| 2D | 3.5 | 1 wt. % $KH_2PO_4$ | 0.07 | 1.5 | 1.6 |
| 2E | 2.5 | 1 wt. % $K_4P_2O_7$ | 0.06 | 1.5 | 1.9 |
| 2F | 3.5 | 1 wt. % $K_4P_2O_7$ | 0.06 | 1.5 | 1.5 |
| 2G | 2.5 | 1 wt. % $Na_5P_3O_{10}$ | 0.08 | 1.5 | 2.4 |
| 2H | 3.0 | 1 wt. % $Na_5P_3O_{10}$ | 0.08 | 1.5 | 1.9 |

TABLE 3

| Composition | Wt. % $H_2O_2$ | Wt. % STP | Molarity of Phosphate Ion [M] | Relative Polishing Rate |
|---|---|---|---|---|
| Control | (HAN) | none | none | 1.0 |
| 3A | 1.5 | 0.25 | 0.02 | 1.4 |
| 3B | 1.5 | 0.5 | 0.04 | 2.1 |
| 3C | 1.5 | 0.75 | 0.06 | 2.2 |
| 3D | 1.5 | 1 | 0.08 | 2.2 |
| 3E | 1.5 | 1.5 | 0.12 | 2.1 |

As is apparent from the data set forth in Table 3, the relative polishing rates exhibited by polishing compositions containing $H_2O_2$ and having 0.02–0.12 M phosphate ion (Compositions 3A–3E) were greater than the relative polishing rate of the control polishing composition. Moreover, the relative polishing rates exhibited by polishing compositions containing $H_2O_2$ and having 0.04–0.12 M phosphate ion (Compositions 3B–3E) were greater than the relative polishing rate of the polishing composition containing $H_2O_2$ and having 0.02 M phosphate ion (Composition 3A).

The data of Table 3 is plotted in the graph of FIG. 1, which depicts the relative polishing rate versus the molarity [M] of phosphate ion in the polishing composition. As is apparent from FIG. 1, the increasing molarity of the phosphate ion in the polishing composition results in a significant increase in the relative removal rate achieved with the polishing composition, with a maximum reported relative removal rate being achieved when the concentration of the source of phosphate ion in the polishing composition is about 0.04 M or higher.

These results demonstrate the significance of the molarity of phosphate ion or phosphonate ion in the polishing composition, and, more particularly, the significance of a concentration of about 0.04 molar or higher of the phosphate ion or phosphonate ion in the polishing composition, on the polishing rate achievable by the present inventive method.

Example 4

This example illustrates that the substrate roughness of a memory or rigid disk achievable by the present inventive method is dependent on the identity of the abrasive material in the polishing system.

Nickel-phosphor plated memory or rigid disks were polished separately with three different polishing compositions with 1.5 wt. % $H_2O_2$, 0.75 wt. % of a source of phosphate ion (specifically, sodium tripolyphosphate(STP)), and 4 wt. % of either silica (specifically, Akzo-Nobel Bindzil 50/80 product) or alumina (specifically, Cabot's RMWA9 fumed alumina product), such that the polishing compositions had 0.06 M phosphate ion, and wherein the polishing compositions had a pH of 2.4–2.6 (specifically, 2.4, 2.5, or 2.6). Following use of the polishing compositions, the substrate roughness achieved by each polishing composition was determined, with the resulting data set forth in Table 4. For comparison purposes, Table 4 also sets forth the relative polishing rate for the control polishing composition as described above.

TABLE 4

| Composition | Abrasive Particles | Source of Phosphate Ion | Molarity of Phosphate Ion [M] | Wt. % $H_2O_2$ | pH | Substrate Roughness [Å] |
|---|---|---|---|---|---|---|
| Control | 4 wt. % silica | (HAN) | 0.0 | none | 3.5 | 1.94 |
| 4A | 4 wt. % silica | 0.75 wt. % STP | 0.06 | 1.5 | 2.4 | 1.8 |
| 4B | 4 wt. % silica | 0.75 wt. % STP | 0.06 | 1.5 | 2.6 | 1.8 |
| 4C | 4 wt. % alumina | 0.75 wt. % STP | 0.06 | 1.5 | 2.5 | 5.3 |

As is apparent from the data set forth in Table 4, the substrate roughness achieved by polishing compositions containing 4 wt. % silica with pH values of 2.4 and 2.6 (Compositions 4A and 4B) was lower than the substrate roughness achieved by the polishing composition with 4 wt. % alumina and a pH of 2.5 (Composition 4C). These results demonstrate the significance of the particular abrasive material on the substrate roughness achievable by the present inventive method.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method for planarizing or polishing a surface of a memory disk comprising abrading at least a portion of the surface with a polishing system comprising (i) a polishing composition comprising water, an oxidizing agent, and about 0.04 M or higher phosphate ion or phosphonate ion, and (ii) abrasive material.

2. The method of claim 1, wherein the polishing composition comprises about 0.04 M or higher phosphate ion.

3. The method of claim 2, wherein the phosphate ion is derived from a water-soluble phosphate.

4. The method of claim 3, wherein the phosphate ion is derived from a source of phosphate ion selected from the group consisting of orthophosphates, polyphosphates, and mixtures thereof.

5. The method of claim 3, wherein the phosphate ion is derived from a source of phosphate ion selected from the group consisting of ammonium phosphate, potassium phosphate, sodium tripolyphosphate, and mixtures thereof.

6. The method of claim 1, wherein the polishing composition comprises about 0.04 M or higher phosphonate ion.

7. The method of claim 6, wherein the phosphonate ion is derived from a source of phosphonate ion selected from the group consisting of amine-containing phosphonates, imine-containing phosphonates, imide-containing phosphonates, amide-containing phosphonates, phosphonate compounds containing no nitrogen, and mixtures thereof.

8. The method of claim 6, wherein the phosphonate ion is derived from a source of phosphonate ion selected from the group consisting of phosphoacetic acid, 2-aminoethyl dihydrogen phosphate, aminotri-(methylenephosphonic acid), nitrilotris(methylene)triphosphonic acid, 1-hydroxyethylidene-1-diphosphonic acid, and diethylenetriaminepenta-(methylenephosphonic acid), and mixtures thereof.

9. The method of claim 1, wherein the surface of the memory disk comprises nickel-phosphorus.

10. The method of claim 1, wherein the polishing system has a pH of about 1–12.

11. The method of claim 10, wherein the polishing system has a pH of about 2–5.

12. The method of claim 1, wherein the abrasive material is abrasive particles selected from the group consisting of alumina, silica, titania, ceria, zirconia, germania, magnesia, coformed products thereof, and mixtures thereof.

13. The method of claim 12, wherein the abrasive particles are silica particles.

14. The method of claim 13, wherein the abrasive particles are condensation-polymerized silica particles.

15. The method of claim 1, wherein the abrasive material is abrasive particles present in the polishing composition in a concentration of about 0.1 wt. % or more.

16. The method of claim 1, wherein the abrasive material is fixed on or in a polishing pad.

17. The method of claim 1, wherein the oxidizing agent is selected from the group consisting of per-compounds, bromates, perbromates, chlorates, perchlorates, dichromates, periodates, iodates, nitrates, permanganates, sulfates, citrates, cerium (IV) compounds, oxidizing metal salts, oxidizing metal complexes, nonmetallic oxidizing acids, ferricyanides, trioxides, and salts thereof, and mixtures thereof.

18. The method of claim 17, wherein the oxidizing agent is selected from the group consisting of peroxides, persulfates, percarbonates, and salts thereof, and mixtures thereof.

19. The method of claim 17, wherein the oxidizing agent is selected from the group consisting of hydrogen peroxide, ammonium persulfate, potassium iodate, and mixtures thereof.

20. The method of claim 1, wherein the oxidizing agent is present in the polishing composition in an amount of about 0.01 wt. % or more.

21. The method of claim 20, wherein the oxidizing agent is present in the polishing composition in an amount of about 0.1 wt. % or more.

22. The method of claim 1, wherein the phosphate-ion or phosphonate ion is present in the polishing composition in an amount of about 0.06 M or higher.

23. The method of claim 1, wherein the phosphate-ion or phosphonate ion is present in the polishing composition in an amount of about 0.08 M or higher.

* * * * *